United States Patent
Hao et al.

(10) Patent No.: US 11,878,378 B2
(45) Date of Patent: Jan. 23, 2024

(54) PROCESS FOR PROCESSING ROTARY TILLAGE BLADE FOR DRY FARMLAND BASED ON WASTED STEEL RAIL

(71) Applicant: China Railway General Resources Technology Co., Ltd., Hefei (CN)

(72) Inventors: Xu Hao, Hefei (CN); Jun Shen, Hefei (CN); Mazhong Ya, Hefei (CN); Yongkang Ji, Hefei (CN); Bin Wu, Hefei (CN); Biao Li, Hefei (CN); Kun Pan, Hefei (CN); Shibiao Zhu, Hefei (CN)

(73) Assignee: China Railway General Resources Technology Co., Ltd., Hefei (CN)

( * ) Notice: Subject to any disclaimer, the term of this patent is extended or adjusted under 35 U.S.C. 154(b) by 0 days.

(21) Appl. No.: 18/128,239

(22) Filed: Mar. 30, 2023

(65) Prior Publication Data
US 2023/0330790 A1 Oct. 19, 2023

(30) Foreign Application Priority Data
Apr. 13, 2022 (CN) .......................... 202210388406.6

(51) Int. Cl.
*B23P 15/28* (2006.01)
*A01B 33/00* (2006.01)
*A01B 33/10* (2006.01)

(52) U.S. Cl.
CPC ............... *B23P 15/28* (2013.01); *A01B 33/00* (2013.01); *A01B 33/10* (2013.01)

(58) Field of Classification Search
CPC ........... B23P 15/28; A01B 33/00; A01B 33/10
See application file for complete search history.

(56) References Cited

U.S. PATENT DOCUMENTS

| 2,574,772 | A | * | 11/1951 | Zorn | ..................... | A01B 33/142 |
| | | | | | | 172/549 |
| 2,601,818 | A | * | 7/1952 | Zwemke | ................ | A01B 33/00 |
| | | | | | | 172/543 |
| 10,595,452 | B2 | * | 3/2020 | Gao | ........................ | A01B 33/02 |
| 2018/0020606 | A1 | * | 1/2018 | Baraldi | ................ | A01B 33/142 |
| | | | | | | 172/772 |

FOREIGN PATENT DOCUMENTS

| CN | 1483563 | A | | 3/2004 |
| CN | 105755351 | A | * | 7/2016 |
| CN | 111822941 | A | | 10/2020 |

* cited by examiner

*Primary Examiner* — Ryan J. Walters
(74) *Attorney, Agent, or Firm* — Bayramoglu Law Offices LLC

(57) ABSTRACT

A process for processing a rotary tillage blade for a dry farmland based a wasted steel rail is provided. The process specifically includes the following steps: selecting a waste annotated steel rail U71Mn or U75V; breaking the steel rail into a rail head, a rail web and a rail bottom in a cutting area by means of a flame cutting device and then cutting the steel rail; and applying a hydrostatic pressure to the steel rail by using a hydraulic machine to separate the rail head, the rail web and the rail bottom. The wasted steel rail can be processed into the rotary tillage blade for the dry farmland by means of methods such as segmenting, rolling, blanking, punching, electric furnace heating, bending, hot forging and thermal treatment. The surface hardness and a wear resistance value thereof are superior to those of an existing rotary tillage blade.

6 Claims, 2 Drawing Sheets

PROCESS FOR PROCESSING ROTARY TILLAGE BLADE FOR DRY FARMLAND BASED ON WASTED STEEL RAIL

CROSS REFERENCE TO THE RELATED APPLICATIONS

This application is based upon and claims priority to Chinese Patent Application No. 202210388406.6, filed on Apr. 13, 2022, the entire contents of which are incorporated herein by reference.

TECHNICAL FIELD

The present invention relates to the technical field of processing of spare parts of rotary cultivators in agricultural machinery equipment, and particularly relates to a process for processing a rotary tillage blade for a dry farmland based a wasted steel rail.

BACKGROUND

At present, along a strategic direction of large-scaled development of novel bullet trains and high speed trains in Chinese railway and energetic develop of novel infrastructures in China, the quantity of railway scrapped materials that are recovered, disposed and recycled has been increased year by year. Since cyclic utilization of railway scrapped materials is a major strategy for the development of circular economy, development of the recycling industry of railway scrapped materials is imperative. Railway transport industry is one of the mainstay industries in national economy. Up to August, 2022, the length of railroad lines in service in China has reached over 141.4 thousand kilometers. According to related data statistics, about 1200 thousand tons of steel rails need to be scrapped in the whole railway every year.

A rotary cultivator, as one of the important agricultural machinery products, is an indispensible tool in agricultural production in China. The rotary cultivator mainly used for cultivating and smoothing operations of farmlands can save the manpower greatly and improve the cultivating efficiency, which is one of the most popular agricultural machinery devices in rural areas at present. A blade of the rotary cultivator is a vulnerable part in the rotary cultivator. Each rotary cultivator is equipped with a plurality of rotary tillage blades, so that there is a large market demand for the rotary tillage blades. In an actual condition, due to friction and impact with soil, sandstones, plants and the like, the blade is often bended, fractured or worn to fail, so that the normal service life is greatly shortened. A material for most rotary tillage blades is 65 Mn in the market. As a result of increasing rise of raw material cost, the processing cost of the rotary tillage blade is high, which does not contribute to development of the rotary cultivator market.

SUMMARY

Aiming at problems in the prior art, the present invention provides a process for processing a rotary tillage blade for a dry farmland based a wasted steel rail. Owing to careful analysis, the major chemical component of the wasted steel rail is U71Mn or U75V which is unlikely to deform and fracture, with good surface hardness and wear resistance. The present invention provides a process method that performs processing by taking the wasted steel rail as a raw material. The wasted steel rail can be processed into the rotary tillage blade satisfying the market demand by means of methods such as segmenting, rolling, blanking, punching, electric furnace heating, bending, hot forging and thermal treatment. The rotary tillage blade is high in comprehensive cost performance, the problem of reutilizing the wasted steel rail can be solved, and meanwhile, the comprehensive utilization value space of the wasted steel rail is further excavated.

The present invention adopts the following technical solution to solve the technical problems: a process for processing a rotary tillage blade for a dry farmland based a wasted steel rail, specifically including the following steps:

S1: selecting a waste annotated steel rail UMn or UV, breaking the steel rail into a rail head, a rail web and a rail bottom in a cutting area by means of a flame cutting device and then cutting the steel rail; and applying a hydrostatic pressure to the steel rail by using a hydraulic machine to separate the rail head, the rail web and the rail bottom, and in a feeding area, selecting a dedicated clamp to hoist the rail head, the rail web and the rail bottom by means of an automatic feeding robot to complete feeding;

S2: then in a heating area, placing the rail head, the rail web and the rail bottom in an electric heating furnace to be heated to red blanks, rolling the red blanks in a hot rolling area, and performing air cooling and cutting and packaging in a cutting and packaging area to form a blank raw material of the rotary tillage blade;

S3: feeding a blank of the blank raw material to a rotary tillage blade production line, wherein the rotary tillage blade production line includes a transporting device, a blanking device, a punching device, the electric heating furnace, a bending device, a hot forging device, a thermal treatment device, a packaging device and an integrated control unit, transporting, by the transporting device, the blank raw material to a blanking area of the blanking device, cutting and segmenting the raw material blank according to the model of the processed rotary tillage blade, punching the cut and segmented raw material blank by means of the punching device according to the shape of the rotary tillage blade, and breaking the raw material blank into blanks before processing of the rotary tillage blade;

S4: orderly placing the blanks before processing of the rotary tillage blade in multiple layers in the electric heating furnace to be heated to red blanks;

S5: completing size processing such as turning radius and bending angle in tangent plane on the heated red blanks through a bending step of the bending device, and then processing an outline structure of the rotary tillage blade by means of the hot forging device;

S6: annealing the formed rotary tillage blade by means of the thermal treatment device, wherein as hardness values of a handle and a body are different, the thermal treatment device needs to be placed to perform thermal treatment on the handle and the body, the surface hardness and the wear resistance thereof meet the requirement of technical indexes, the hardness of the handle is controlled at HRC, and the hardness of the body is controlled at HRC; and S7: spraying the rotary tillage blade subjected to the thermal treatment by means of the packaging device as required or cartoning a rotary tillage blade finished product.

Preferably, in S1, the waste annotated steel rail (50 rail or 60 rail) is selected, the steel rail is broken down into the rail head, the rail web and the rail bottom in the cutting area, and the steel rail is then cut into 2-3 cm in length.

Preferably, in S2, in the heating area, the rail head, the rail web and the rail bottom are then placed in the electric heating furnace to be heated to the red blanks at 1200° C.-1250° C.

Preferably, in S3, controlled by a PLC controller in the integrated control unit, automatic control of the blank raw material from feeding to packaging is realized, so that the process is safe, reliable and efficient.

Preferably, in S4, the blanks before processing of the rotary tillage blade are orderly placed in multiple layers in the electric heating furnace to be heated to red blanks at 1200° C.-1250° C.

Preferably, in S5, size processing such as turning radius and bending angle in tangent plane is completed on the heated red blanks through the bending step of the bending device, and then the outline structure of the rotary tillage blade is processed by means of the hot forging device, wherein the turning radius is 250 mm and the bending angle in the tangent plane is 130°.

The present invention has the following advantages:

according to a process for processing a rotary tillage blade for a dry farmland based a wasted steel rail provided by the present invention, by utilizing comprehensive advantages of stable chemical components and performance of a wasted steel rail material, the wasted steel rail can be processed into the rotary tillage blade for the dry farmland by means of methods such as segmenting, rolling, blanking, punching, electric furnace heating, bending, hot forging and thermal treatment. The surface hardness and a wear resistance value thereof are superior to those of an existing rotary tillage blade. The process can be popularized and applied to solve the problem that the rotary tillage blade is high in processing cost and low in comprehensive utilization value, can realize comprehensive reutilization of the wasted steel rails, and has huge economical and social benefits.

BRIEF DESCRIPTION OF THE DRAWINGS

Further description of the present invention will be made below in combination with drawings and embodiments.

DETAILED DESCRIPTION OF THE EMBODIMENTS

In order to make technical means, creative features, objectives to achieve and efficacies implemented by the present invention be easily understood, the present invention will be further illustrated below in combination with specific embodiments.

Figure 1:
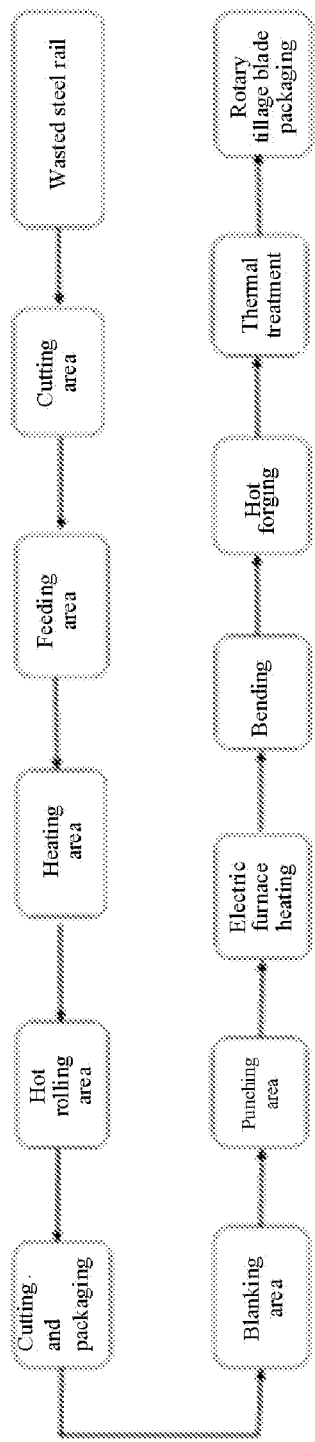
FIG. 1 is a flowchart of a process for processing a rotary tillage blade for a dry farmland based a wasted steel rail provided by the present invention.
Figure 2:
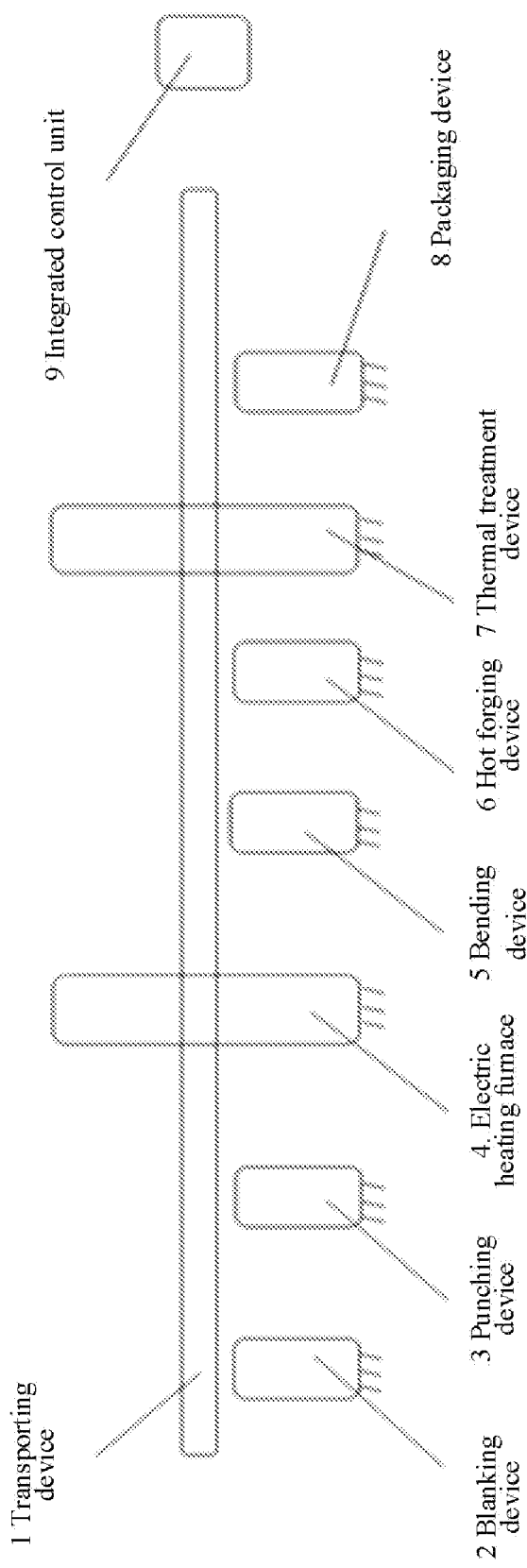
FIG. 2 is a simplified top view schematic diagram of a rotary tillage blade production line in the present invention.

As shown in FIG. 1-FIG. 2, the process for processing a rotary tillage blade for a dry farmland based a wasted steel rail provided by the present invention includes a process method for processing the wasted steel rail into the blank raw material and a process method for processing the rotary tillage blade. The process method mainly taking the wasted steel rail as the processing raw material is simple in production process and easy to operate, thereby fully excavating the reutilization comprehensive value of the wasted steel rail. The process mainly includes two parts: 1, the process methods subjecting the wasted steel rail to the cutting area, the feeding area, the heating area, the hot rolling area, the cutting and packaging area and the like realize the processing course from the wasted steel rail to the raw material blanks, thereby providing raw materials for processing the rotary tillage blade; 2, the process methods subjecting the raw material blanks to the blanking area, the punching area, the electric furnace heating, the bending, the hot forging, the thermal treatment, the rotary tillage blade packaging and the like realize the process for processing the raw material blanks to the rotary tillage blade. The process specifically includes the following steps:

S1: a waste annotated steel rail U71Mn or U75V is selected, the steel rail is broken into a rail head, a rail web and a rail bottom in a cutting area by means of a flame cutting device and then the steel rail is cut; and a hydrostatic pressure is applied to the steel rail by using a hydraulic machine to separate the rail head, the rail web and the rail bottom, and in a feeding area, a dedicated clamp is selected to hoist the rail head, the rail web and the rail bottom by means of an automatic feeding robot to complete feeding;

S2: then in a heating area, the rail head, the rail web and the rail bottom are placed in an electric heating furnace to be heated to red blanks, the red blanks are rolled in a hot rolling area, and air cooling and cutting and packaging are performed in a cutting and packaging area to form a blank raw material of the rotary tillage blade;

S3: a blank of the blank raw material is fed to a rotary tillage blade production line, wherein the rotary tillage blade production line includes a transporting device 1, a blanking device 2, a punching device 3, the electric heating furnace 4, a bending device 5, a hot forging device 6, a thermal treatment device 7, a packaging device 8 and an integrated control unit 9, the blank raw material is transported by the transporting device 1 to a blanking area of the blanking device 2, the raw material blank is cut and segmented according to the model of the processed rotary tillage blade, the cut and segmented raw material blank is punched by means of the punching device 3 according to the shape of the rotary tillage blade, and the raw material blank is broken into blanks before processing of the rotary tillage blade;

S4: the blanks before processing of the rotary tillage blade are orderly placed in multiple layers in the electric heating furnace to be heated to red blanks;

S5: size processing such as turning radius and bending angle in tangent plane is completed on the heated red blanks through a bending step of the bending device, and then an outline structure of the rotary tillage blade is processed by means of the hot forging device 6;

S6: the formed rotary tillage blade is annealed by means of the thermal treatment device 7, wherein as hardness values of a handle and a body are different, the thermal treatment device needs to be placed to perform thermal treatment on the handle and the body, the surface hardness and the wear resistance thereof meet the requirement of technical indexes, the hardness of the handle is controlled at 40 HRC, and the hardness of the body is controlled at 50 HRC; and S7: the rotary tillage blade subjected to the thermal treatment is sprayed by means of the packaging device 8 as required or cartoning a rotary tillage blade finished product. The process for processing a rotary tillage blade for a dry farmland based a wasted steel rail provided by the present invention can process the wasted steel rail into the rotary tillage blade satisfying the market demand by means of methods such as segmenting, rolling, blanking, punching, electric furnace heating, bending, hot forging and thermal treatment, solve the problem that the rotary tillage blade is high in processing cost and low in comprehensive utilization value, and realize comprehensive reutilization of the wasted steel rails.

In an optional implementation mode of the embodiment of the present invention, in S1, the waste annotated steel rail (50 rail or 60 rail) is selected, the steel rail is broken down into the rail head, the rail web and the rail bottom in the cutting area, and the steel rail is then cut into 2-3 cm in length.

In an optional implementation mode of the embodiment of the present invention, in S2, in the heating area, the rail head, the rail web and the rail bottom are then placed in the electric heating furnace to be heated to the red blanks at 1200° C.-1250° C.

In an optional implementation mode of the embodiment of the present invention, in S3, controlled by a PLC controller in the integrated control unit 9, automatic control of the blank raw material from feeding to packaging is realized, so that the process is safe, reliable and efficient.

In an optional implementation mode of the embodiment of the present invention, in S4, the blanks before processing of the rotary tillage blade are orderly placed in multiple layers in the electric heating furnace to be heated to red blanks at 1200° C.-1250° C.

In an optional implementation mode of the embodiment of the present invention, in S5, size processing such as turning radius and bending angle in tangent plane is completed on the heated red blanks through the bending step of the bending device, and then the outline structure of the rotary tillage blade is processed by means of the hot forging device 6, wherein the turning radius is 250 mm and the bending angle in the tangent plane is 130°.

The basic principle, main features and advantages of the present invention are shown and described above. Those skilled in the art shall understand that the present invention is not subject to limitation of the above-mentioned embodiments. The above-mentioned embodiments and description merely describe the principle of the present invention. There will be various variations and improvements of the present invention without departing from the spirit and scope of the present invention, and these variations and improvements shall fall into the claimed scope of the present invention. Therefore, the claimed protection scope of the present invention shall be defined by the appended claims and equivalents thereof.

What is claimed is:

1. A process for processing a rotary tillage blade for a dry farmland based a wasted steel rail, comprising the following steps:
    S1: selecting a waste annotated steel rail comprised of U71Mn or U75V, breaking the waste annotated steel rail into a rail head, a rail web and a rail bottom in a cutting area by means of a flame cutting device and cutting the waste annotated steel rail; and
    applying a hydrostatic pressure to the waste annotated steel rail by using a hydraulic machine to separate the rail head, the rail web and the rail bottom, and in a feeding area, selecting a dedicated clamp to hoist the rail head, the rail web and the rail bottom by means of an automatic feeding robot to complete a feeding;
    S2: in a heating area, placing the rail head, the rail web and the rail bottom in an electric heating furnace to be heated to red blanks, rolling the red blanks in a hot rolling area, and performing air cooling and cutting and packaging in a cutting and packaging area to form a blank raw material of the rotary tillage blade;
    S3: feeding a blank of the blank raw material to a rotary tillage blade production line, wherein the rotary tillage blade production line comprises a transporting device, a blanking device, a punching device, the electric heating furnace, a bending device, a hot forging device, a thermal treatment device, a packaging device and an integrated control unit,
        transporting, by the transporting device, the blank raw material to a blanking area of the blanking device,
        cutting and segmenting a raw material blank according to a model of the processed rotary tillage blade,
        punching the cut and segmented raw material blank by means of the punching device according to a shape of the rotary tillage blade, and
        breaking the raw material blank into blanks before a processing of the rotary tillage blade;
    S4: orderly placing the blanks before the processing of the rotary tillage blade in multiple layers in the electric heating furnace to be heated to red blanks;
    S5: completing a size processing such as a turning radius and a bending angle in a tangent plane on the heated red blanks through a bending step of the bending device, and processing an outline structure of the rotary tillage blade by means of the hot forging device;
    S6: annealing the formed rotary tillage blade by means of the thermal treatment device, wherein as hardness values of a handle and a body are different, the thermal treatment device needs to be placed to perform a thermal treatment on the handle and the body, a surface hardness and a wear resistance of the handle and the body meet a requirement of technical indexes, wherein the surface hardness of the handle is controlled at 40 HRC, and the surface hardness of the body is controlled at 50 HRC; and
    S7: spraying the rotary tillage blade subjected to the thermal treatment by means of the packaging device or cartoning a rotary tillage blade finished product.

2. The process according to claim 1, wherein in S1, the waste annotated steel rail (50 rail or 60 rail) is selected, the waste annotated steel rail is broken down into the rail head, the rail web and the rail bottom in the cutting area, and the waste annotated steel rail is cut into 2-3 cm in length.

3. The process according to claim 1, wherein in S2, in the heating area, the rail head, the rail web and the rail bottom are placed in the electric heating furnace to be heated to the red blanks at 1200° C.-1250° C.

4. The process according to claim 1, wherein in S3, controlled by a PLC controller in the integrated control unit, an automatic control of the blank raw material from feeding to packaging is realized, wherein the process is safe, reliable and efficient.

5. The process according to claim 1, wherein in S4, the blanks before the processing of the rotary tillage blade are orderly placed in the multiple layers in the electric heating furnace to be heated to the red blanks at 1200° C.-1250° C.

6. The process according to claim 1, wherein in S5, the size processing such as the turning radius and the bending angle in the tangent plane is completed on the heated red blanks through the bending step of the bending device, and the outline structure of the rotary tillage blade is processed by means of the hot forging device, wherein the turning radius is 250 mm and the bending angle in the tangent plane is 130°.

* * * * *